(12) United States Patent
Gabriel

(10) Patent No.: US 6,315,241 B1
(45) Date of Patent: Nov. 13, 2001

(54) BUOYANCY SYSTEM FOR AVOIDING LIGHT AIRCRAFT CRASHES

(76) Inventor: Edwin Zenith Gabriel, 91 Mt. Tabor Way, Ocean Grove, NJ (US) 07756

( * ) Notice: Subject to any disclaimer, the term of this patent is extended or adjusted under 35 U.S.C. 154(b) by 0 days.

(21) Appl. No.: 09/470,737

(22) Filed: Dec. 23, 1999

(51) Int. Cl.[7] .............................. B64C 15/14; B64D 25/00
(52) U.S. Cl. ...................... 244/12.1; 244/23 A; 244/139
(58) Field of Search .............................. 244/5, 12.1, 12.3, 244/23 A, 139

(56) References Cited

U.S. PATENT DOCUMENTS

| | | | |
|---|---|---|---|
| 1,705,535 | * 3/1929 | Riffert | 244/5 |
| 3,056,565 | * 10/1962 | Griffith | 244/12.3 |
| 3,061,241 | * 10/1962 | Holland, Jr. | 244/23 A |
| 3,309,041 | * 3/1967 | Etchberger | 244/23 A |

\* cited by examiner

Primary Examiner—Robert P. Swiatek

(57) ABSTRACT

A relatively simple system for avoiding light aircraft crashes, using rate-of-turn sensors, high pressure air containers and solenoid-operated air valves. The rate-of-turn sensors, when magnitude of turns exceed the predetermined values, close one or more relays, which then cause solenoids to operate to open air valves, allowing high pressure air to blast out to prevent misbehavior of the aircraft, such as excessive roll or pitch axis turning, while also providing buoyancy to the aircraft so that the aircraft does not lose altitude rapidly. This aircraft crash avoidance system operates automatically, without any need for pilot input. However, the pilot has the ability and option to disengage any or all portions of the crash avoidance system.

7 Claims, 7 Drawing Sheets

CONTROLS FOR ZONED SYSTEM

RATE SENSOR BLOCK DIAGRAM

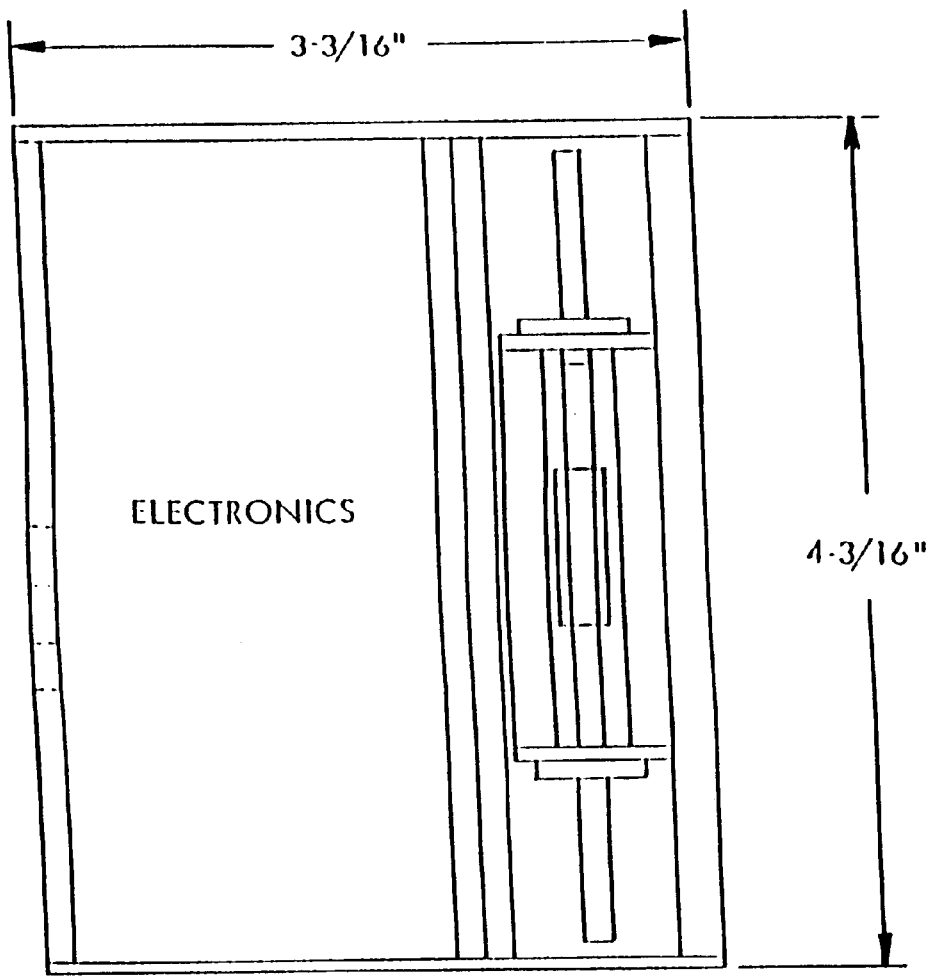
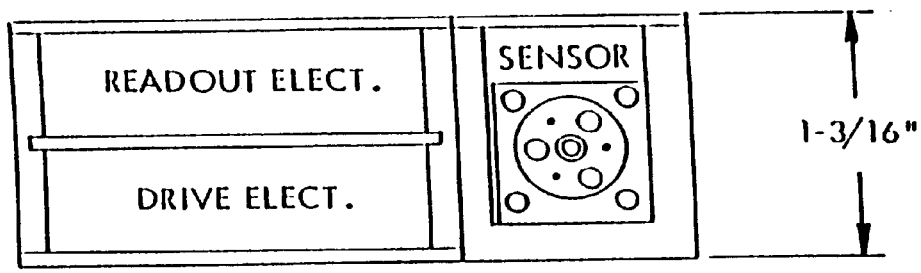
Figure 8. Breadboard Rate Sensor Package (SECTION)

BUOYANCY SYSTEM FOR AVOIDING LIGHT AIRCRAFT CRASHES

CROSS-REFERENCES TO RELATED APPLICATIONS

This is not a continuation-in-part of a previous application, nor one that is co-pending.

RIGHTS TO INVENTIONS MADE UNDER FEDERALLY-SPONSORED RESEARCH AND DEVELOPMENT

None of the work on this invention was performed under any Federally-Sponsored or State-Sponsored research and development. Gabriel used his own resources on every phase of his project.

BACKGROUND OF THE INVENTION

1. Field of the Invention

This invention is in the field of aircraft safety in flight, wherein even if the pilot were to make an error, the system will attempt to make corrections to avoid and prevent the aircraft from crashing. This system could be applied both to a fixed or a rotary wing aircraft. This disclosure with illustrations describes how the system functions to prevent an aircraft from going out of control and crashing, using rate of turn sensors, high pressure air tanks and solenoid-operated valves.

2. Description of Prior Art

The inventor is aware only of his own U.S. patent applications. His Ser. No. 09/366,263, filed Aug. 02, 1999, includes drawings of a fixed wing and a rotary wing aircraft, utilizing compressed air tanks, solenoid-operated air valves and micro switches sensitive to wind gusts. A drawing also is shown of a belly of a fixed wing aircraft with tanks and air valves for providing buoyancy to the aircraft when its speed of descent becomes too rapid. A relay closes the circuit for the solenoid to operate and open the valve inlet ports for high pressure air from the tanks to pass through and blast out at their outlet ports, to provide buoyancy for the air craft.

SUMMARY OF THE INVENTION

This is a novel technique for helping to prevent a light-weight aircraft from crashing should the aircraft experience engine or mechanical control problems. Air valves are judiciously positioned on the belly of the aircraft and their controls are zoned to blast out high pressure air at selected air valve outlet ports, to provide buoyancy and/or to prevent the aircraft from rolling and pitching along their axes in excess of a predetermined value in degrees. A rate of turn sensor is provided for each of the following: left side and right side roll, and pitch angle. An altimeter, sensitive to the rate of the aircraft's descent, is provided with an output voltage to operate a relay to close the circuits for the solenoid-operated air-valves, providing aircraft buoyancy, to slow down the aircraft's rate of descent. A law in physics states that for each action there is a reaction. This is essentially the principle that enables the aircraft to experience buoyancy when the air valves are blasting out high pressure air in the desired direction.

BRIEF DESCRIPTION OF DRAWINGS

For the purpose of illustrating the control system for preventing light aircraft crashes, the following drawings show forms which are presently preferred. It is to be understood that this invention is not necessarily limited to the precise arrangement, instrumentalities and field of utility as therein demonstrated.

FIG. 8 shows the breadboard rate sensor package with. outside dimensions.

DESCRIPTION OF A PREFERRED EMBODIMENT

This is a zoned buoyancy system for Aircraft, including selective automatic lift of Fuselage to prevent roll over or excessive negative pitch angle of the aircraft.

Figure 1:
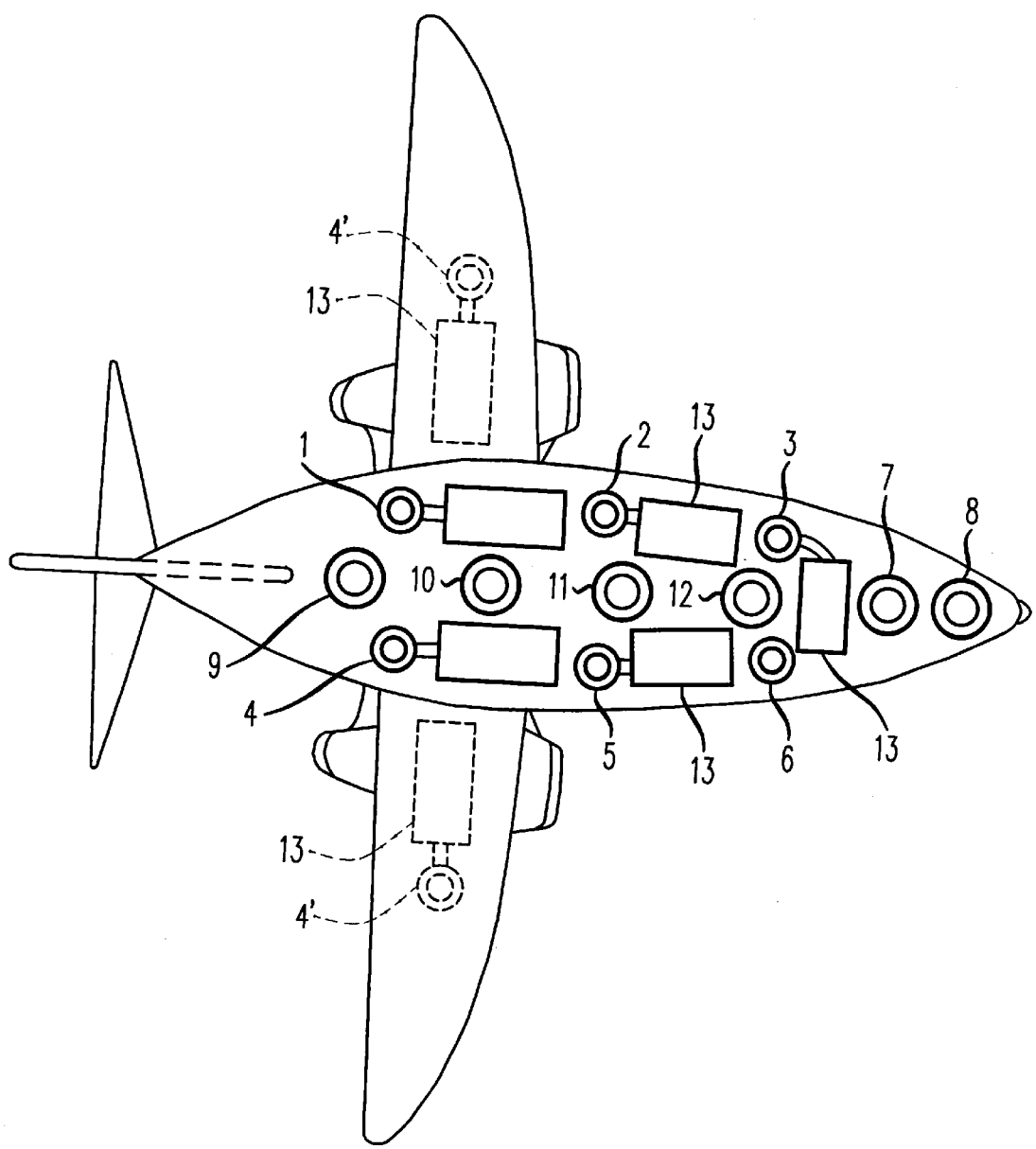
FIG. 1 shows the belly of a fixed wing aircraft, with the twelve air-valve outlet ports, for correcting any misbehavior of the aircraft.

FIG. 1 shows an underneath view of a fixed wing aircraft showing valve outlet ports of 12 valves. Some of the air tanks supplying air to the valves may be located inside the fuselage, at least partially, to allow more space to place air valve ports in the most effective locations to produce the desired buoyancy.

For automatic operation of the air valves, rate-of-turn sensors are provided, which measure both rates-of-turn and also the angle-of-turn. When the selected maximum angle of turn is reached, the air valves which would correct and reduce that undesirable angle are turned on, producing blasts of air. If the pitch of the aircraft exceeds, say 15° declination, air valves, 11, 12, 7 and 8, FIG. 1, are turned "ON" raising the front end of the fuselage. If the aircraft is rolling excessively on its left side, then air valve outlets 1, 2 and 3 are turned "ON", to prevent any further roll of the aircraft. Similarly, if the roll is excessive on its right side, air valve outlets 4, 5 and 6 are turned "ON". Then, if the aircraft is losing altitude because of lack of fuel, air outlets 9, 10, 11, 12, 7 and 8 may be turned "ON" at an expeditious moment to enable the aircraft to make a soft landing instead of crashing at a high falling speed. Various firms manufacture almost all of the parts and electric components needed for this aircraft crash prevention system. For example, high pressure air cylinders, up to 3000 psi, are available from Luxfer of California and Catalina of Florida.

Figure 2:
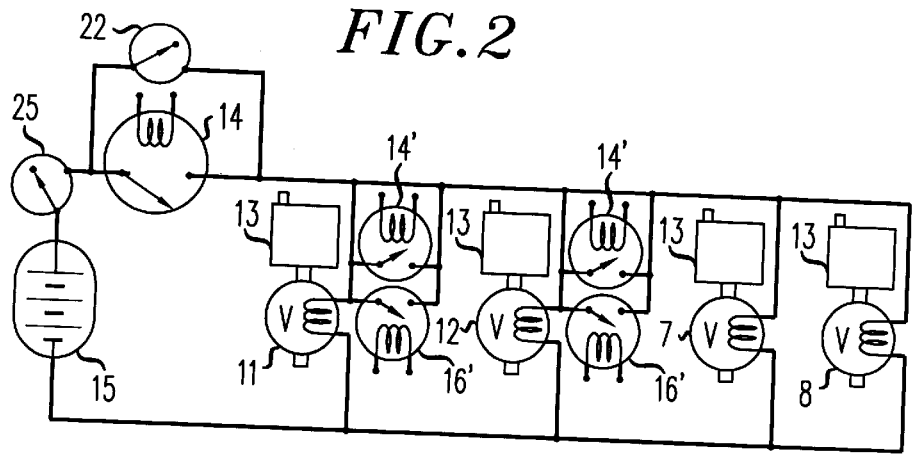
FIG. 2 is a schematic wiring diagram of 4 solenoid-operated air valves for automatically controlling the pitch axis angle of the aircraft, correcting for any large, negative pitch angle. A relay automatically closes the circuit when its rate-of-turn sensor senses a large angle in pitch.
Figure 6:
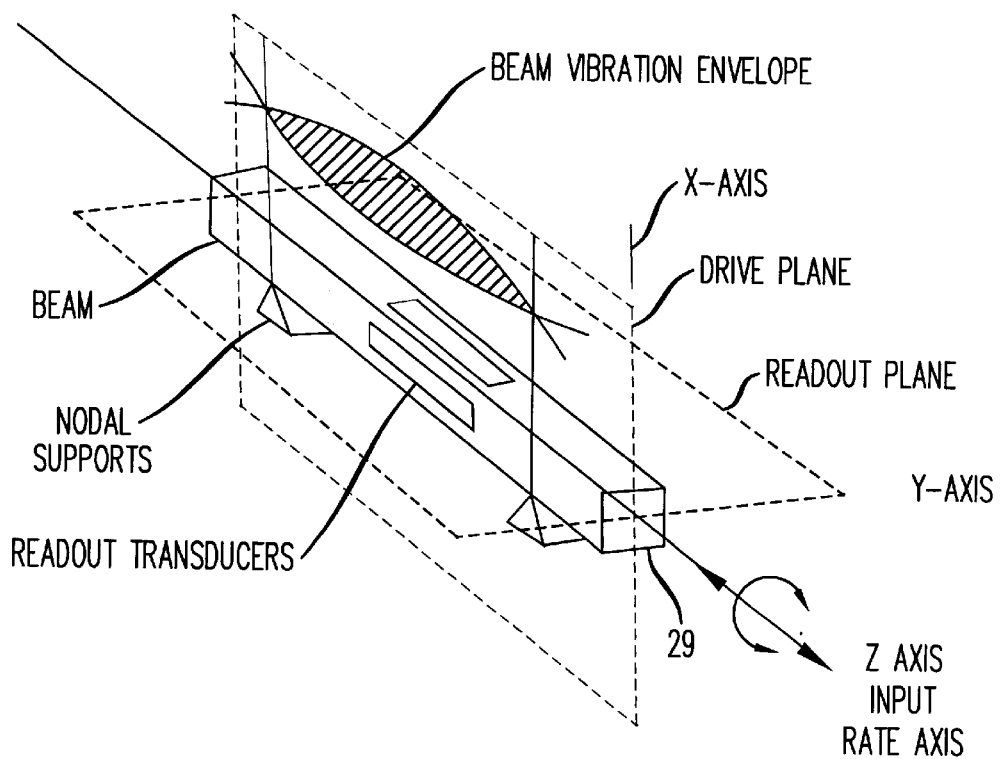
FIG. 6 shows a three-dimensional mechanical diagram of a vibrating beam sensor, sensing changes in angular rate.

FIG. 2 shows the schematic for the pitch axis of the zoned buoyancy system. The system can be operated either manually using switch 22, or automatically using rate-of-turn sensor 29, FIG. 6, and relay 14 to close the circuit of the electrical loop. In the schematic, four valves, 11, 12, 7, 8 with solenoids and connecting air tanks, one for each valve, are shown. In the case of valves 11 and 12, relay 14', activated by pitch angle rate-of-turn sensor, and relay 16', activated by fuselage buoyancy descent sensor are added, because of an overlap in the function of these two valves 11 and 12. Relay 14, in series with the four valves, is closed by the output integrated voltage of the pitch rate sensor, when a selected value of voltage is reached, corresponding to the maximum acceptable pitch angle. Voltage supply 15 provides the required voltages and currents to the four solenoids of valves, 7, 8, 11 and 12. High pressure air is provided by tanks 13. A gate valve may be added to the piping between each tank and its valve. A manual switch 25 is added in series with the relay, in case the pilot wishes to disconnect the pitch-axis control system.

Figure 3:
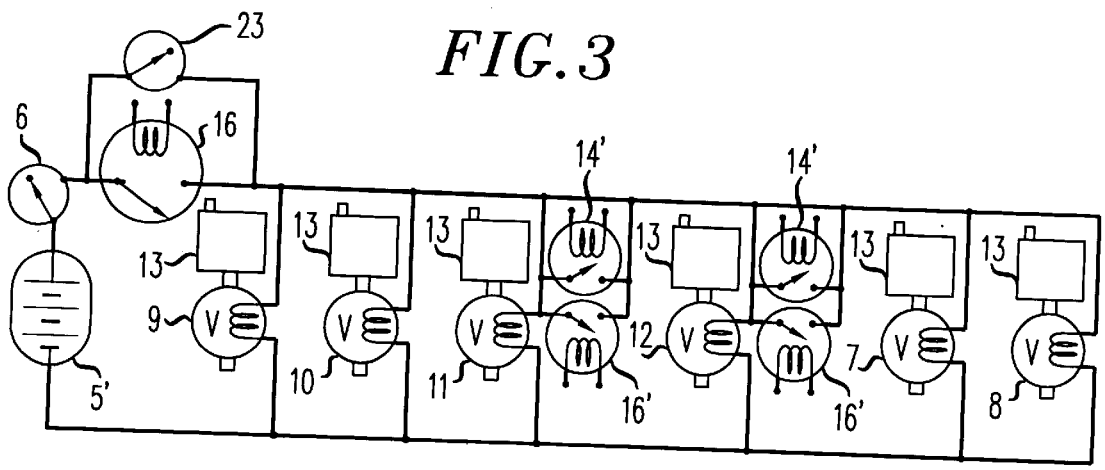
FIG. 3 shows the schematic diagram for providing buoyancy for the entire belly of the fuselage. Six air valve outlet ports are shown. The relay in series automatically closes the circuit when the altimeter voltage output indicates an excessive drop in altitude as a result of the rate of altitude decline increasing beyond a specified, predetermined value, to prevent a crash on the terrain below.

FIG. 3 shows the schematic drawing for the aircraft fuselage buoyancy system to prevent the aircraft from descending too rapidly. Six solenoid-operated valves, 9, 10, 11, 12, 7 and 8 are located across the length of the belly of the aircraft. Additional valves could be provided to provide the desired buoyancy, the number and size of valves depending on the weight of the aircraft. This system can be operated either manually, using switch 23, or automatically using a radar altimeter for rate of loss of altitude for operating relay 16 to close the circuit of the electrical logo. In the case of valves 11 and 12, again relay 14' activated by pitch angle rate-of-turn sensor and relay 16', activated by fuselage buoyancy descent sensor, are added, because of an overlap in the function of these two valves, 11 and 12. Relay 16, in series with the six valves, is closed by the output of the altimeter's rate of descent voltage, when a selected value of voltage is reached. Voltage Supply 15' provides the required voltage to the 6 solenoids of valves 9, 10, 11, 12, 7 and 8. High pressure air is provided by compressed air tanks 12. A gate valve may be added to the piping between each valve and its tank. A manual switch 26 is added in series with relay 16, in case the pilot wishes to disconnect the air buoyancy system for the aircraft. The air pressures from the six valves should be great enough and in sufficient volume to provide sufficient buoyancy for a light-weight aircraft.

Figure 4:
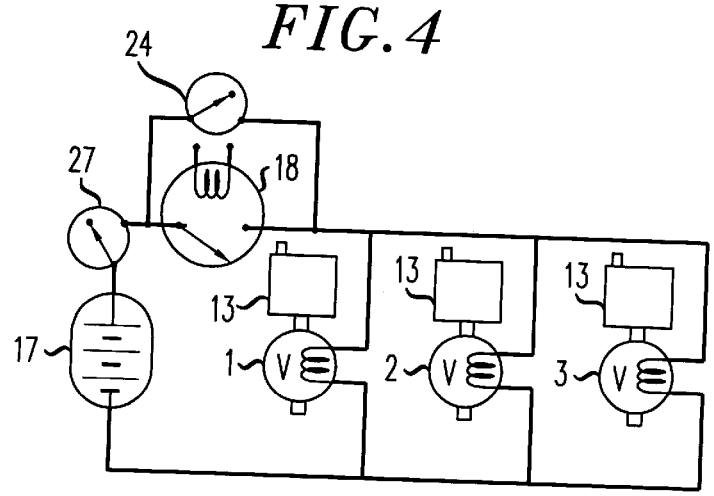
FIG. 4 is a schematic wiring diagram of three solenoid-operated air valves for automatically controlling and correcting for any excessive left side roll angle or rate-of-turn of the aircraft. A relay, remotely controlled, automatically closes the circuit shown when the rate-of-roll sensor senses a roll angle beyond a predetermined value, to prevent the aircraft from going out of control.

FIG. 4 shows the schematic for the aircraft left-side roll control system for preventing excessive roll angle of the fuselage. The system can be activated either manually, using switch 24, or automatically using rate-of-turn sensor 29, FIG. 6, and relay 18 to close the circuit of the electrical loop. In the schematic, three valves 1, 2 and 3, with solenoids and connecting air tanks 13, are shown and used for preventing excessive aircraft roll angle, although more valves with solenoids could be used, if necessary to prevent excessive roll angle. Relay 18 in series with the three valves, is closed by the output integrated voltage of the roll rate sensor, when a predetermined selected value of voltage is reached, corresponding to the maximum acceptable aircraft roll angle. Voltage supply source 17 provides the required voltages and currents to the three solenoids of valves 1, 2 and 3. High pressure air is provided by tanks 13. A gate valve may be added to the piping between each tank and its valve, for one to close in case of undesirable air leakage in the valve. A manual switch 27 is added in series with the relay, in case the aircraft pilot wishes to disconnect this roll-axis air-buoyancy system.

Figure 5:
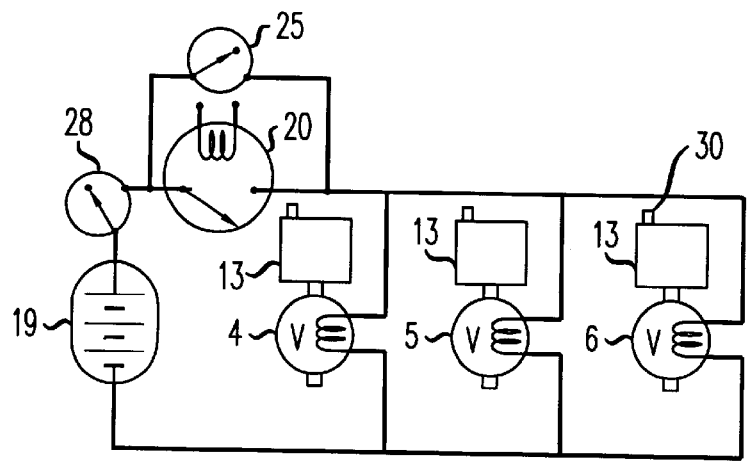
FIG. 5 is a schematic wiring diagram of three solenoid-operated air valves for automatically correcting for any excessive fuselage right side roll angle of the aircraft.

FIG. 5 shows the schematic for the aircraft right-side roll control system for preventing excessive roll-axis angle of the fuselage. Here again the system can be activated either manually, using switch 25, or automatically using rate-of-turn sensor 29, FIG. 6, and relay 20 to close the circuit of the electrical loop shown. In the schematic, three valves 4, 5 and 6, with solenoids and connecting air tank 13, are shown and used for preventing excessive aircraft roll angle, although additional valves with solenoids may be used, if needed, to prevent excessive aircraft roll over. Relay 20, in series with the three valves, is closed by the output integrated voltage of the roll rate sensor, when a predetermined selected value of voltage is reached, corresponding to the maximum acceptable aircraft roll angle. Voltage supply source 19 provides the required voltage and current to each of the three solenoids of valves 4, 5 and 6. High pressure air is provided by tanks 13. The tanks may be refilled with air via air valve 30 or the valves may be connected to an air compressor to be refilled with air automatically when the tank pressure lowers. A gate valve may be added to the piping between each tank and its valve, for one to close, in case of undesirable air leakage in the valve, when closed. A manual switch 28 is added in series with relay 20, in case the aircraft pilot wishes to disconnect the roll-axis,air-buoyancy system.

DESCRIPTION OF RATE-OF-TURN SENSORS

For automatic operation of the air blasts to correct for any excessive rolling or pitching of the aircraft fuselage, rate-of-turn sensors are employed to cause the appropriate selected zoned buoyancy control system to operate and correct for the undesirable turn motion in roll or pitch of the aircraft. The buoyancy feature avoids the aircraft's rapid descent.

There may be eight different rate-of-turn sensors, such as:
1. The conventional rate sensor gyro, with high speed rotor.
2. Electro-fluidic vortex rate sensor, angular;
3. Solid state vibrating beam rate sensor (VBS);
4. Piezo-electric transducer arrangement for VBS;
5. Nuclear spin gyro;
6. Strapdown laser gyro;
7. The Ring laser;
8. Electro static rate gyro.

It is desirable to select a rate-of-turn sensor that has long life, small weight and size, requires low power, have a linear output dynamic range and possesses high reliability (MTBF). The vibrating beam rate sensor meets the above criteria most ably, although anyone of the above mentioned eight sensors may be used to obtain angular rate and angular displacement information for these systems.

Figure 7:
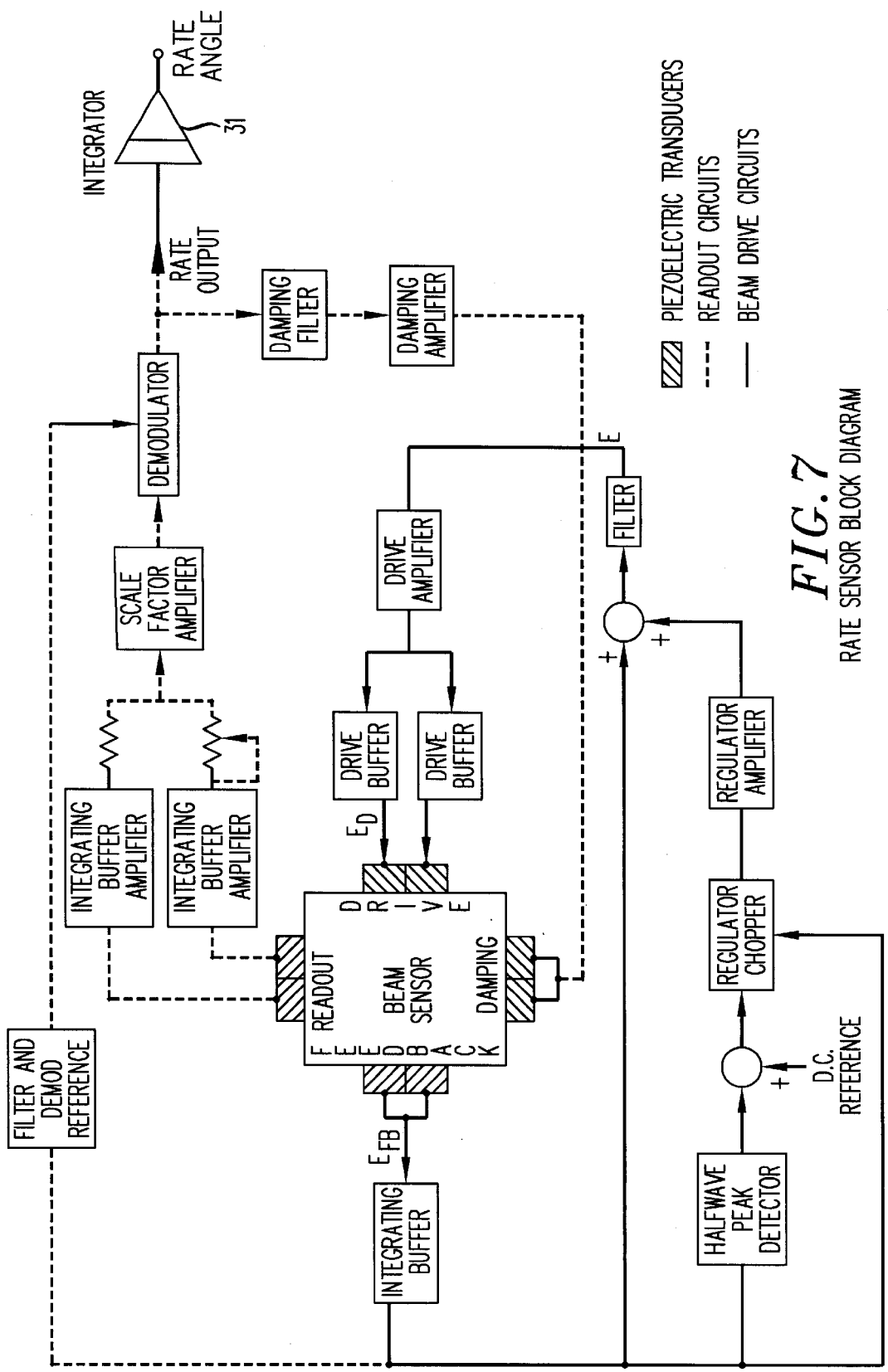
FIG. 7 shows a block diagram of the electronics of the vibrating beam sensor, including the electronics of the read out and beam drive circuits.

A block diagram of the entire beam rate sensor system is shown in FIG. 7, originally designed by engineers of General Electric Co., Binghamton, N.Y. now acquired by Lockheed-Martin, Johnson City, N.Y., in 1992. To obtain either pitch angle or roll angle, an analog integrator 31 has been added to the rate output voltage of the block diagram.

A block diagram of the hardware is shown in FIG. 8, providing dimensions of the enclosure. Top and side views are shown.

Figure 9:
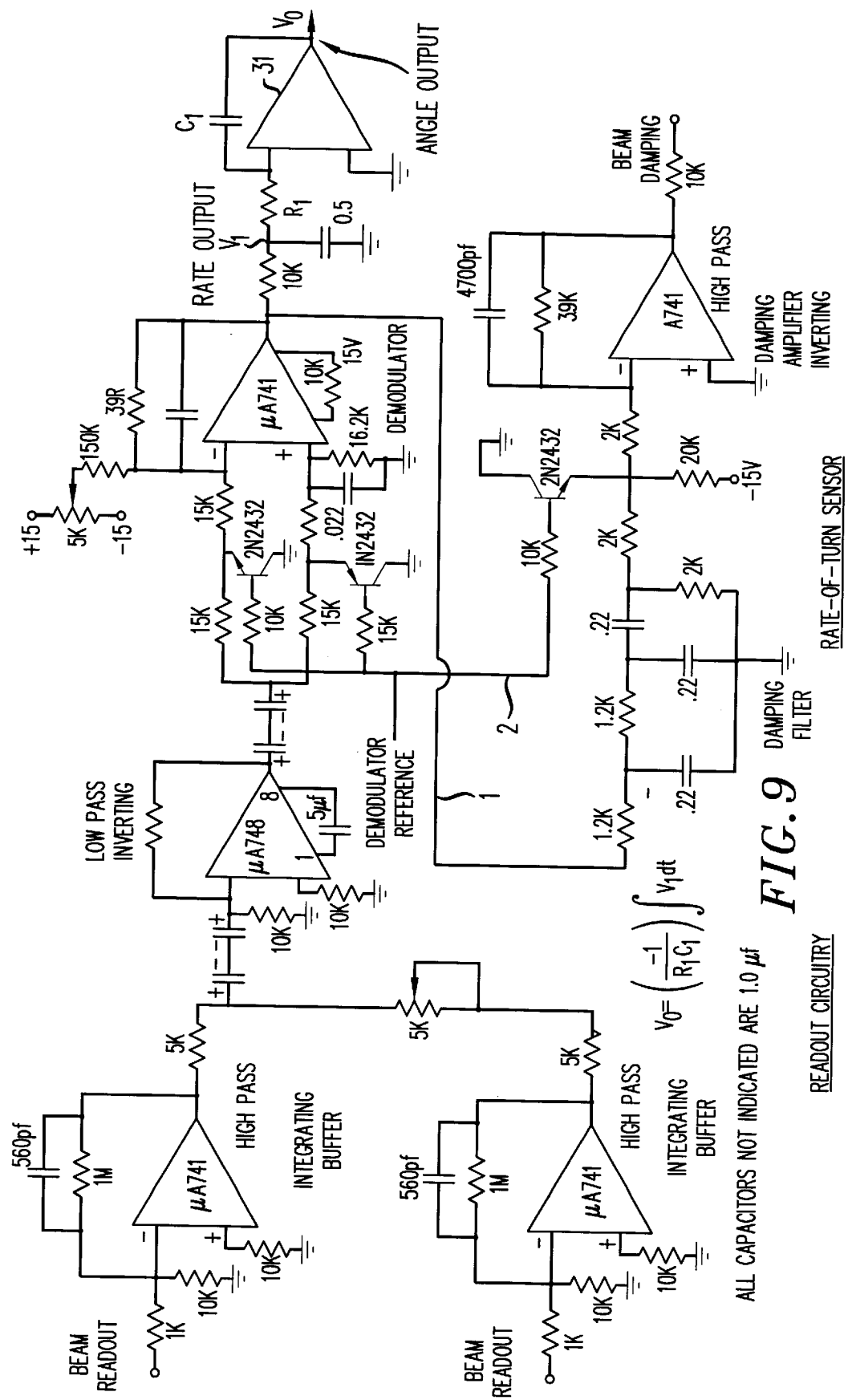
FIG. 9 shows the read-out circuitry of the rate-of-turn sensor, including an integrator at its output to provide angular information.

The readout circuitry for the beam rate-of-turn sensor is shown in FIG. 9, with an analog integrator at its output to provide angle-of-turn voltage information for inputs to relays 16, 18 and 20, FIGS. 2, 4 and 5. When the angle-of-turn voltage reaches a predetermined value, the appropriate relay for that beam sensor is activated and closed, to close the circuit of that electrical loop. This read-out circuitry is designed by General Electric Co. and is part of the Rate Sensor Package, FIG. 8.

The features of the vibrating beam sensor are listed below:

Life: 2–5 years

Weight: 2 oz. beam alone, (1.16 lbs with electronics)

Power: 1 watt, 15V dc

Size: ¾×1.5×2 in., plus additional for read-out and drive electronics.

Linear Dynamic range $10^4$ to $10^5$ (1% full scale)

Reliability: 32,000 hours (MTBF)

Start-up time: 1–7 seconds

Dynamic range: +/−9 V dc

Null Uncertainty: 0.1 to 0.4°/sec.

Maximum angular rate: 200°–1300°/sec

Frequency response: 40 Hz

Linear range: +/−20°/sec

The reason for selection of the vibrating beam sensor is that a highly reliable rate-of-turn sensor is desirable to avoid aircraft crashes.

This system is designed to operate automatically so that even if the pilot were to become temporarily disabled, the aircraft's going out-of-control could be avoided.

A Suggested Solenoid Valve

Figure 10:
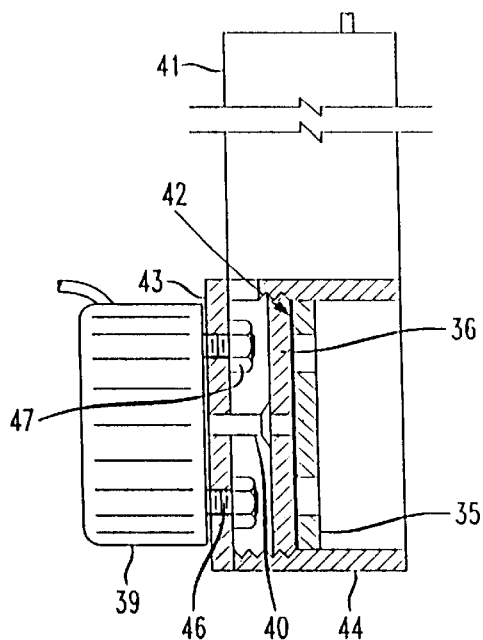
FIG. 10 shows another solenoid valve for allowing air from a compressed air tank to blast through. This is a sectional assembly view of the valve with an attached rotary, low profile pull type solenoid. The valve is in the closed position.
Figure 11:
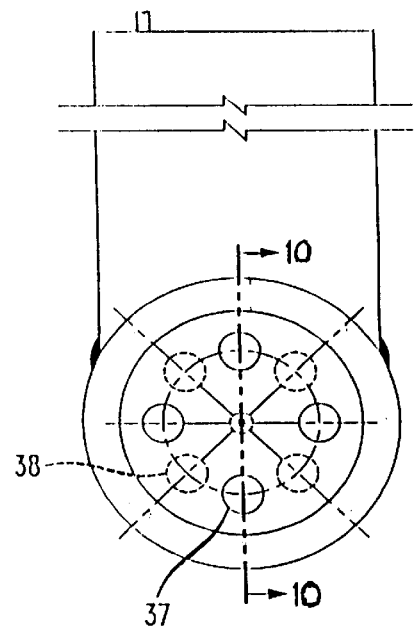
FIG. 11 is a front view of the valve, showing the four holes in each disc of the valve completely out of alignment, to prevent air flow.
Figure 12:
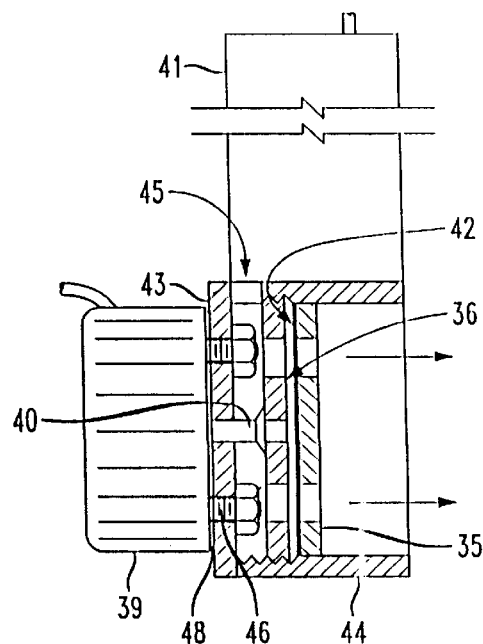
FIG. 12 shows the solenoid valve in the open position, with the four holes, with each disc aligned with the other, so air from the tank can flow through. One disc is air-tightly fixed to the valve's pipe, while the other disc is fastened to the solenoid's shaft and rotatable.
Figure 13:
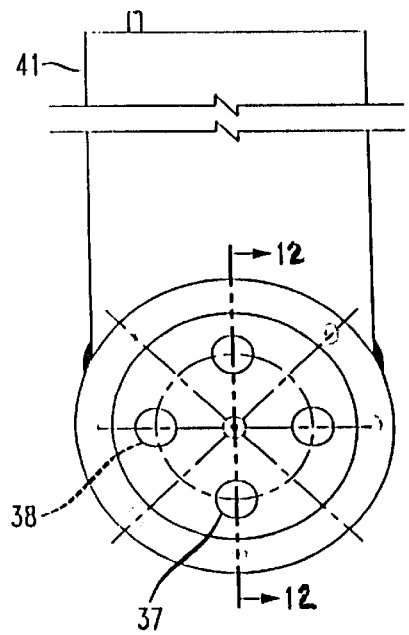
FIG. 13 is a front view of the valve, showing the four holes in each disc completely in alignment, to permit air flow.

This is a technique for allowing air from tank 41 to blast through two discs with holes selectively placed, one disc has a low profile LEDEX rotary type solenoid plunger attached via shaft 40. When power is off to the solenoid, the four holes 37 on disc 35, fixed to pipe 44, representing the valve body, do not coincide with the four holes 38 in disc 36 as shown in FIGS. 10 and 11. Rubber gasket 42 assures air-tightness between discs, 35 and 36, when valve, FIG. 14, is in closed position. Portion of Internal surface of pipe 44 is threaded, as shown, and so is periphery of disc 36. Valve's tightness would resemble a cap screwed on to a jar with the cap having a rubber membrane inside to assure air-tightness. When power is applied to solenoid 39, its shaft 40 rotates 45° to separate disc 36 from disc 35, while enabling their holes 37 and 38 to come into alignment for incoming air from tank 41 to blast out through circular openings 37, as shown in FIGS. 12 and 13. Twice as many openings could be provided, if desired, by adding holes to discs 37 and 38. FIG. 10 is a section along line 10—10 of FIG. 11, while FIG. 12 is a section along line 12—12 of FIG. 13. Tank 41 is fastened air-tightly to pipe 44, with only opening 45 for air to pass through to valve's cavity. Solenoid 39 is sealed at end of pipe 44 air tightly so no air can leak out, at that end of pipe cover 43. Plate 43 covers end of pipe 44 with holes for studs 46 and shaft 40. Also a thin gasket 48 exists between the face of solenoid 39 and plate 43. Nuts 47, FIG. 10, are screwed onto studs 46, prior to installing discs 35 and 36. Plunger 40 and ¹⁄₁₆ inch longitudinal play. Piping is preferred between tank 41 and valve.

What is claimed is:

1. A light aircraft with a fuselage wings and a belly and with provision to provide buoyancy to the entire aircraft, when needed to avoid said aircraft from crashing, so that said aircraft would descend slowly and land on terrain softly instead of crashing at a high descent speed, said provision being an electrical control circuit, compressed air tanks and solenoid-operated air valves with input and output ports, said control circuit comprising a voltage source, a first manual switch, a remotely operated relay in series with the solenoids of said air valves with all solenoids connected in parallel with said voltage source, said air valves and said tanks being mounted on said belly of said fuselage, with each of said air valve input ports being connected to a tank with piping, said remotely-operated relay having its circuit closed by the output voltage of an altimeter, said first manual switch for short-circuiting said relay; all buoyancy air valves, when opened, to blast air out vertically downward to provide buoyancy to said aircraft in its descent to prevent a plane crash on the surface below upon landing.

2. A light aircraft with provision for avoiding a crash in accordance with claim 1, wherein a control system is provided with a rate-of-turn sensor for sensing pitch rate of said fuselage and with means for preventing said aircraft from exceeding an acceptable, predetermined pitch rate and pitch angle, said solenoid-operated air valves located toward the front end of said belly, and being controlled to open by said sensors to blast air downward to cause said fuselage to move upward to slow down the rate of aircraft descent, said provision including said remotely-operated relay, a rate-of-turn sensor having an analog integrator at its output to produce voltages corresponding to the aircraft's pitch-axis angle, the number and size of said air valves being sufficient to produce the desired pitch angle effect on said aircraft, said remotely-operated relay opening said air valves to blast out high pressure air when needed.

3. A light aircraft with provision for avoiding a crash in accordance with claim 1, wherein a control system is provided with a rate-of-turn sensor for sensing roll rate and roll angle for each left and right side of said fuselage, and with means for preventing said aircraft from exceeding a predetermined, selected roll rate and roll angle, said solenoid-operated air valves located along the left and right sides of the belly of said fuselage, and the valves of each side being controlled to open by said sensor to blast out air to reduce the magnitude of said roll angle of said fuselage to help the pilot regain control of the aircraft, said provision including for each side an additional remotely-operated relay, and a rate-of-turn sensor sensing roll rate having an analog integrator at its output to produce voltages corresponding to the aircraft's roll-axis angle, the number and size of said air valves being sufficient to produce the desired roll angle effect on said aircraft to prevent said aircraft from going out of control, whether the roll should occur on the aircraft's left or right side, said remotely-operated relay opening said appropriate air valves to blast out high pressure air when needed.

4. A lightweight aircraft with provision for avoiding a crash in accordance with claim 1, wherein three zoned control systems are provided with one zone providing a rate-of-turn sensor for sensing pitch rate and a second zone and a third zone for sensing roll rates of said fuselage by rate-of-turn sensors; hence, with means for preventing said aircraft from simultaneously exceeding acceptable pitch and roll rates, said means being a pitch axis sensor and two roll axis sensors, one each for the fuselage's left and right side, additional solenoid-operated air valves located toward the front end of said belly for pitch control and along each side of said fuselage belly for roll axis controls; a closed loop circuit for each of said three zones, each loop including a voltage supply and a remotely-operated relay, in series with the selected solenoids, wired in parallel with each other, operating the air valves, each said relay being operated by a rate-of-turn sensor voltage output; thus, when both the aircraft's pitch and roll angles exceed predetermined acceptable magnitudes, as sensed by their respective rate-of-turn sensors, both sets of air valves, both for pitch and roll angle control, automatically blast air from their outlet ports to prevent said aircraft from going out of control and crashing.

5. A lightweight aircraft with provision for avoiding a crash in accordance with claim 4, wherein each said zone can be operated either manually using a manual switch in parallel with said remotely-operated relay or automatically by said relay, with said manual switch position open.

6. A lightweight aircraft with provision for avoiding a crash in accordance with claim 4, wherein each said zone having a second manual switch in its circuit, in series with said voltage supply, to enable the pilot of said aircraft to open the circuit of that zone, should that zone, when on, operate unacceptably to prevent an unacceptable rate-of-turn about its prescribed fuselage axis.

7. A light-weight aircraft with provision for avoiding a crash in accordance with claim 1, wherein additional air valves are mounted underneath the left and right wings of the aircraft to provide additional counter forces to oppose any excessive roll rate of the aircraft, a rate exceeding a predetermined permissive roll rate and roll angle.

* * * * *